US011935309B2

(12) United States Patent
Hotson et al.

(10) Patent No.: US 11,935,309 B2
(45) Date of Patent: Mar. 19, 2024

(54) DETERMINING TRAFFIC LIGHT LABELS AND CLASSIFICATION QUALITY FROM INFRASTRUCTURE SIGNALS

(71) Applicant: Ford Global Technologies, LLC, Dearborn, MI (US)

(72) Inventors: Guy Hotson, Mountain View, CA (US); Richard L. Kwant, San Bruno, CA (US); David James Chekan, Pittsburgh, PA (US); Reza Azimi, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 304 days.

(21) Appl. No.: 17/001,999

(22) Filed: Aug. 25, 2020

(65) Prior Publication Data
US 2022/0067406 A1  Mar. 3, 2022

(51) Int. Cl.
*G06F 18/214* (2023.01)
*G06V 20/58* (2022.01)
*G08G 1/01* (2006.01)
*G08G 1/095* (2006.01)
*G08G 1/096* (2006.01)

(52) U.S. Cl.
CPC ........ *G06V 20/584* (2022.01); *G06F 18/2148* (2023.01); *G08G 1/0116* (2013.01); *G08G 1/095* (2013.01); *G08G 1/096* (2013.01)

(58) Field of Classification Search
None
See application file for complete search history.

(56) References Cited

U.S. PATENT DOCUMENTS

| | | | |
|---|---|---|---|
| 8,296,030 B2 | 10/2012 | Luo et al. | |
| 8,712,104 B2 | 4/2014 | Fairfield et al. | |
| 9,229,314 B2 | 1/2016 | Terasawa et al. | |
| 9,272,709 B2 | 3/2016 | Ben Shalom | |
| 9,550,498 B2 | 1/2017 | Meyer et al. | |
| 9,690,297 B1 | 6/2017 | Ferguson et al. | |
| 9,951,739 B2 | 4/2018 | Huber et al. | |
| 10,108,868 B1 | 10/2018 | Wendel et al. | |
| 11,017,203 B1* | 5/2021 | Aggarwal | G06V 40/1365 |
| 2016/0318490 A1 | 11/2016 | Ben Shalom | |
| 2016/0318523 A1 | 11/2016 | Kim et al. | |
| 2018/0215386 A1* | 8/2018 | Naserian | F02D 41/0087 |

(Continued)

FOREIGN PATENT DOCUMENTS

CN 108108761 B 5/2020

*Primary Examiner* — John F Mortell
(74) *Attorney, Agent, or Firm* — Frank MacKenzie; Brooks Kushman, P.C.

(57) ABSTRACT

This document discloses methods of training a classifier to identify traffic signal states in images captured be a vehicle. The vehicle can then use the identified states when making movement decisions when traveling in an environment. The system determines that a traffic signal is within a field of view of the camera (i.e., within an image). The system also receives a signal with signal phase and timing data for the traffic signal. The system processes the images to identify an image that includes the traffic signal. The system analyzes the signal data to determine a state of the traffic signal at the time of image capture, labels the image with a label of determined state, and passes the image and a label to a classifier in order to train the classifier.

22 Claims, 7 Drawing Sheets

(56) References Cited

U.S. PATENT DOCUMENTS

| | | | |
|---|---|---|---|
| 2018/0307925 A1 | 10/2018 | Wisniowski et al. | |
| 2018/0373980 A1* | 12/2018 | Huval | G06F 18/41 |
| 2020/0135030 A1* | 4/2020 | Krivokon | G06V 20/588 |
| 2020/0160126 A1 | 5/2020 | Malach et al. | |
| 2020/0245109 A1* | 7/2020 | Yang | H04W 4/12 |
| 2021/0201057 A1* | 7/2021 | Lin | G06F 18/24 |

\* cited by examiner

DETERMINING TRAFFIC LIGHT LABELS AND CLASSIFICATION QUALITY FROM INFRASTRUCTURE SIGNALS

BACKGROUND

As autonomous vehicles (AVs) travel in a real-world environment, they must be able to classify various objects that their sensors detect. For example, AV detection systems need to detect and classify traffic signals and classify them as red, yellow or green, or according to another status such as blinking.

To classify detected objects, AVs typically rely on deep neural networks. However, to train a deep neural network to perform accurate classification, large amounts of labeled data are required. The process of labeling data is time consuming and expensive. In the case of labeling traffic light data, teams of people must manually identify the face locations, bulb locations, bulb types, and bulb states of hundreds or even thousands of traffic lights on a daily basis to build up training sets that can number in the millions of traffic light faces. In addition, training sets are more valuable when they include examples in which a human labeler corrects a label that an automated system got wrong, as this helps to teach the network and avoid inaccurate labeling in the future. In cases where an AV system provider changes vehicle platforms or wishes to operate in new environmental conditions, the lead time required for labeling large data sets requires that changes be planned several months in advance. This requirement places constraints on the operational abilities of the AV while the labeling process is completed. Improved labeling methods are therefore desired to help train neural networks for use in object classification processes.

In addition, the evaluation of a deep neural network as applied to an AV takes time, often a day or more complete. This means that any evaluation of a neural network may be somewhat stale. Improved evaluation techniques are therefore also needed to help AVs accurately identify traffic signals and other objects in their environment.

This document describes methods and systems that are directed to addressing the problems described above, and/or other issues.

SUMMARY

This document discloses methods of training a classifier to identify traffic signal states in images. In various embodiments, a vehicle while traveling in an environment may use a camera to capture images of the environment. The vehicle may determine that a traffic signal is within a field of view of the camera, and it may save some or all of the images to a data store along with a time of capture of each saved image. Alternatively, a processor may access an already-existing data store with such information. The processor, which may be onboard the vehicle or in a system external to the vehicle, may process the saved images to identify an image that includes the traffic signal. The processor will determine the time of capture of the identified image, access signal data that indicates signal phase and timing of the traffic signal at the time of capture, analyze the signal data received at the time of capture to determine a state of the traffic signal at the time of capture, label the identified image with a label of determined state, and pass the identified image and the label to a classifier. The classifier may then use the identified image and the label to train the classifier.

Optionally, the processor may also process the saved images to identify of additional images that each include additional traffic signals. For each of the additional images the processor may extract, from the data store, a time of capture for the additional image. For each additional image, the processor may then analyze additional signal data to determine a state of the additional traffic signal in the additional image at the time of capture for the additional image. The processor may label each additional image with a label the determined state of the additional traffic signal, and it may pass the additional image and its label to the classifier. The classifier will also use the additional images and the labels for each of the additional images to further train the classifier.

Optionally, a vehicle (which may be the same vehicle as noted above, or it may be a different vehicle) may use a camera to capture new images of the environment. A processor may then determine that one of the new images includes a traffic signal, and it may use the classifier to determine a state of the traffic signal that is in the determined new image. The processor also may access new signal data that was collected when the determined new image was captured, extract a signal state from the signal data, and determine whether the extracted signal state matches the state that the classifier determined. If the extracted signal state does not match the state that the classifier determined, the system may use the determined new image, the extracted signal state and the state that the classifier determined to further train the classifier.

Optionally, determining that the traffic signal is within a field of view of the camera may include by the processor, using a global positioning sensor to determine a location of the vehicle, analyze map data to identify features of the location that are ahead of the vehicle that are in the field of view of the camera, and determine that one of the identified features is the traffic signal.

Optionally, a transceiver of the vehicle may receive the signal data from a roadside unit (RSU) as a signal phase and timing (SPaT) message. If so, then determining that the traffic signal is within a field of view of the camera may include: (i) receiving, via the transceiver, map data from the RSU; (ii) using a global positioning system sensor to determine a location of the vehicle; and (iii) correlating the map data to the determined location of the vehicle and a planned path of the vehicle to determine that the traffic signal is in the field of view.

Optionally, if processor includes a processor component that is integral with the vehicle, then determining that the traffic signal is within a field of view of the camera may include detecting the traffic signal when processing the images to identify the image that includes the traffic signal.

Optionally, the processor may receive an annotation for the identified image. If so, then when passing the identified image and the label to the classifier, the processor also may pass the annotation to the classifier. The classifier may also use the annotation to train the classifier.

Optionally, the processor may: (i) identify an additional image that includes an additional traffic signal; (ii) determine a time of capture for the additional image; (iii) analyze additional signal data to determine a state of the additional traffic signal in the additional image at the time of capture for the additional image; (iv) receive a manually-input label for the additional traffic signal; and (v) determine whether the determined state of the additional traffic signal matches the manually-input label. If the determined state of the additional traffic signal matches the manually-input label, the processor may pass the additional image and its label to the classifier for use in training the classifier, otherwise it may not pass the additional image to the classifier.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
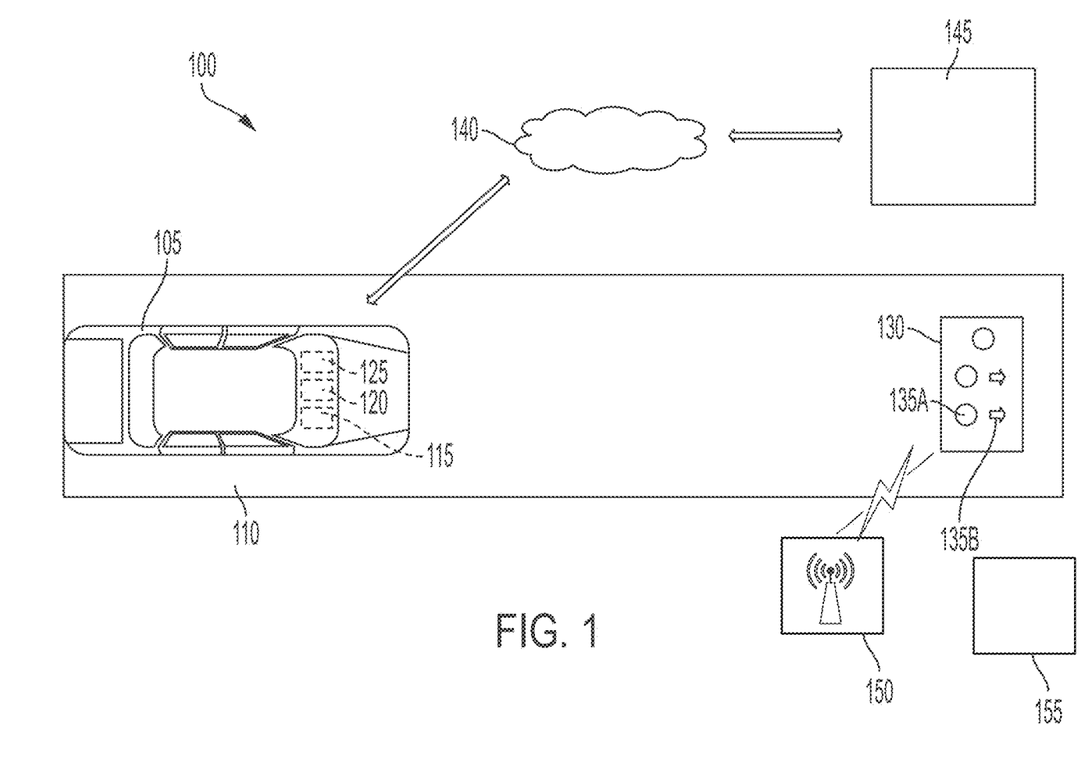
FIG. 1 is an example of a system for identifying and classifying traffic signal devices, in accordance with various embodiments of the present disclosure.

Referring now to FIG. 1, a system 100 for identifying and classifying traffic signal devices 130 is shown. According to various embodiments, the system 100 includes a vehicle 105. As shown, the vehicle 105 is traveling on a road 110. However, any suitable path may be implemented.

The vehicle 105 may include a computer vision system 115 configured to receive a digital image of a traffic signal device 130. The computer vision system 115 may include one or more cameras for capturing digital images of various features of the environment in which the vehicle 105 is traveling.

Such features may include one or more traffic signal devices 130. The traffic signal device shown in FIG. 1 (with more detail shown by way of example in the prior art image of FIG. 2) includes several traffic signal elements 135A, 135B. The traffic signal elements 135A, 135B are dynamic in that they can be switched between at least two states to transmit traffic instructions to one or more drivers, and different types of signal elements 135A, 135B may be present in a single traffic signal device 130. Traffic signal elements are the elements of a traffic signal device that may be turned on and off, turned or moved, or otherwise changed to determine the signal provided by the device. Examples of traffic signal elements may include, for example, a red light, a yellow light and a green light 135A. Other examples include lights with directional arrows 135B (such as arrows pointing left or right), other symbols (such as a symbol of a person walking), or words. In each of these examples, each light can be switched between an off state and an on state. Lights may be Light Emitting Diodes (LEDs), bulbs, and/or any other suitable lighting element that conveys the state of a traffic signal element 135A, 135B. According to various embodiments, the light may be reflective in nature.

Figure 2:
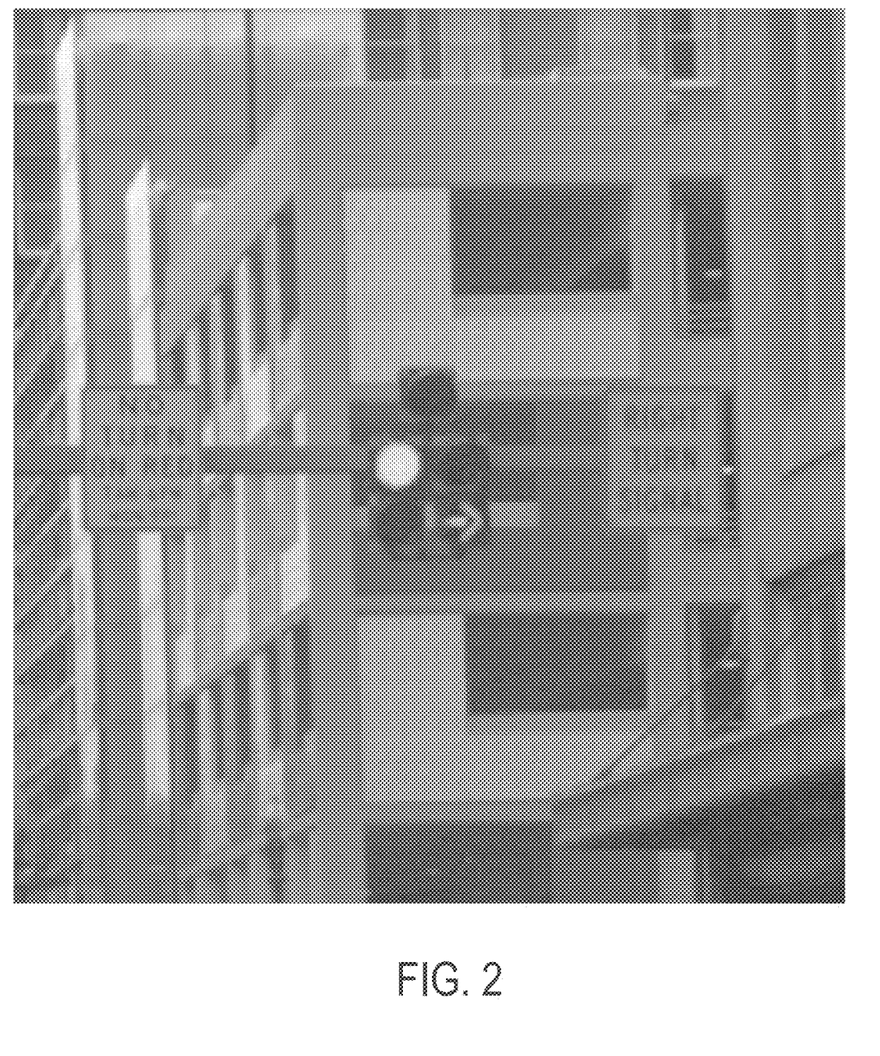
FIG. 2 is an example of an image of an example traffic signal device as may exist in the prior art.

The signal elements 135A, 135B are represented in FIG. 2 for illustration purposes as circular lights and arrow lights. However, the features of each of the signal elements 135A, 135B may be any of various signal element features such as, for example, a green light, a yellow light, a red light, a circular light, a left arrow light, a right arrow light, a light having an arrow positioned in any direction, a forward arrow light, a flashing green light, a flashing yellow light, a flashing red light, a U-turn light, a bicycle light, an X-light, and/or any other suitable traffic signal element features. It is further noted that the traffic signal device 130 may include any suitable number of signal elements 135A, 135B, having various positions on the face of the traffic signal device 130. The traffic signal elements 135A, 135B correspond to a designated light fixture configured to transmit traffic instructions to one or more drivers.

Returning to FIG. 1, the traffic signal device 130 may include or be communicatively connected to a roadside unit (RSU) 150 that includes a transceiver, a processor, and programming instructions or circuitry configured to cause the RSU to receive status information from the traffic signal device 130 and broadcast the traffic signal device's status information to nearby vehicles such as vehicle 110. In some embodiments, the messages may include the data and format used for what are generally known as signal phase and timing (SPaT) messages. However, other data, message types and protocols may be used. The RSU 150 also may broadcast map data that includes information about the geometry of the intersection. (Such messages may include those commonly referred to in the traffic control field as MAP messages, although other types of messages may be used.) The RSU 150 transmitter may operate on a short-range communications protocol such as the dedicated short-range communications (DSRC) protocol, and the vehicle will have a transceiver 120 that can receive messages that use such a protocol. The RSU 150 may be a standalone device that communicates with the traffic signal device 130, or it may be integrated into the housing of the traffic signal device 130. The RSU also may be communicatively connected to, or integral with, an advanced transportation controller (ATC) 155, which is a hardware and software platform (including a processor, software, and a housing) for intelligent transportation system applications that employs ATC standards such as those published by the Institute of Transportation Engineers and by the United States Department of Transportation.

The vehicle's transceiver 120 (which may be one or more devices) also may be configured to send and receive digital information from a remote server 145 via a wired and/or wireless communication network such as, for example, through the a cellular communication network 140, wherein the vehicle 105 and the remote server 145 are in electronic communication with each other. The vehicle 105 may further include a processor 125. The processor 125 may be configured to represent the traffic signal device 130 as a raster image (such as that shown in FIG. 3) in which each traffic signal element 135A, 135B of the traffic signal device 130 is represented by a mask corresponding to a location of the traffic signal element 135, 135B on the traffic signal device 130. The processor 125 may be a dedicated processor for a vehicle computer vision or other system, a processor that performs various functions for the vehicle, and/or a processor of the remote server 145. Data processed by any processor may be data received from the vehicle 105, received from the remote server 145, and/or a combination of data from the vehicle 105 and the remote server 145.

Figure 3:
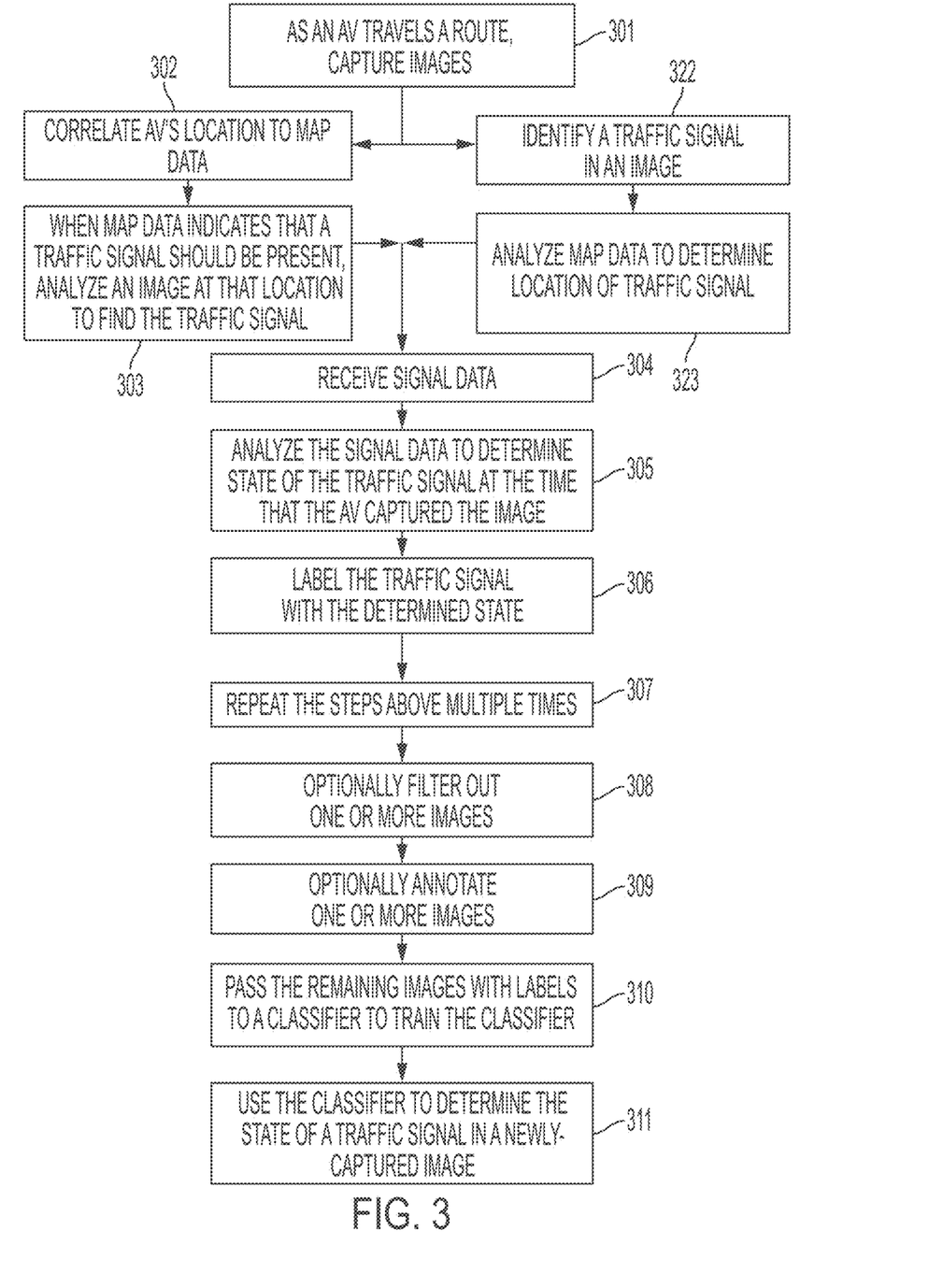
FIG. 3 illustrates an example method of training a classifier to identify traffic signal states in captured images.

FIG. 3 illustrates an example method of training a classifier to identify traffic signal states in images. As an AV or other vehicle travels in an environment, it will use one or more cameras to capture digital images of the environment (step 301). As the system captures the images, it will save them along with a time of capture in a data store. The vehicle may perform various processing steps that will now be described, or the vehicle may transfer its captured data to a remote processing device (such as server 145 in FIG. 1) to perform one or more of the steps.

The vehicle may identify that a traffic signal is in a field of view of the camera, and thus likely to be in one or more of images in various ways. For example, at 302 the vehicle may determine its location and correlate that location to map data. One way in which the vehicle may do this is to use a global positioning system (GPS) sensor to determine the vehicle's location, analyzing map data to identify features of the location that are ahead of the vehicle that are in the field of view, and determine that one of the identified features is a traffic signal. When the map data indicates that a traffic signal should be present, the system will conclude that a traffic signal must be present in the camera field of view, and at step 303 the system will analyze an image at that location to find the traffic signal. Alternatively, the system may reverse the order such that at step 322 the system may simply process multiple images to look for traffic signals. When the system identifies a traffic signal in an image, it will analyze the map data to determine location of the traffic signal (step 323).

In either of these processes, the system may receive the map data in any of multiple ways. For example, the vehicle may store the map data locally. The system may transmit a call to a remote server to analyze the map data and return an indication of whether a traffic signal is present. A transceiver of the vehicle may receive the map data from a roadside unit (RSU) when the vehicle is within communication range of the RSU. Other methods may be used, or combinations of these may be used.

The system may use any suitable method to process the images and identify traffic signals in the images. Various methods are well known in the art of image processing. For example, the system may identify one or more regions of interest (ROIs) in each image, and use a classifier to process the image and identify potential or actual traffic signals in the image. The system may use color thresholding (i.e., looking for images in which at least one of the three colors of a traffic light—red, yellow or green—is present), binary large object (BLOB) detection and analysis, spot light detection (i.e., looking for light areas that are surrounded by darker areas) and/or other now or hereafter known image processing methods to identify the traffic lights.

Regardless of the process, contemporaneous with, before or after determining that a traffic signal is within a field of view of the camera (i.e., that an image is likely to include a traffic signal), at 304 the system also will receive signal data that indicates signal phase and timing of the traffic signal. In step 304, the vehicle may receive the signal data via a transceiver from an external source, such as in a SPaT message from an RSU that located near a traffic signal, and if so the system may save this signal data to the data store. Alternatively, in step 304 the system may receive the signal data in the form of a data set in which each item of signal data is associated with a time of capture (i.e., a time at which the signal data was collected). At 305 the system will then analyze the signal data to determine a state of the traffic signal at the time of capture. For example, SPaT messages will typically include a signal state, along with an indicator of how long the current state will persist for each approach and lane that is active. The vehicle may determine the lane in which it is traveling (from GPS data and/or other ground truth information) and extract the signal data for that lane from the SPaT message.

At 306 the system will label the traffic signal in the identified image with a label of determined state. For example, the system may assign the image a label that identifies an active signal element as being a red light, yellow light, green light, directional signal or other signal element. The system will save the label in association with the image.

Optionally, at 308 one or more additional steps may be used to determine whether the image should be used to train a classifier, or whether it should be filtered out. For example, a human may observe the image and the label to determine whether the system applied the correct label to the traffic signal in the image, or the system may assess accuracy of a human label against the system's analysis of the image. If the label is correct (such as a red light being correctly labeled "red"), the image and label may remain; if not (such as a red light being incorrectly labeled "green"), the image and label may be filtered out by being discarded or simply not used, or by correcting the label before using the image).

In addition, at 309 one or more human annotators may add one or more annotations with additional information about the image and/or traffic signals within the image, such as vehicle pose data or other information. Other annotations such as weather conditions at the time that the image was captured (such as rain, sun, clouds or fog), or whether the image was captured in daylight or darkness, may be included. Such information may be retrieved from external sources such as by transmitting a query to a weather service or database of weather information, or manually added by human annotation. When a human does the annotation, the human may view the image in a display of a computing device and use a user input such as a keyboard, touch screen or microphone to add the annotation, which the system will save to a data store in association with the image, such as in a memory. In addition, an incorrectly labeled image may not be filtered out but instead may remain with an annotation that the label as incorrect, and/or an indication of what the correct label should be. This information could be helpful to train a classifier to label future images and/or signals within images.

At 310, any image that survives any screening steps such as those described above will be passed, along with its label(s), to a classifier. The classifier will then use the identified image and the label(s) to train the classifier.

The system may repeat the process above for multiple images (step 307). In addition, when processing images the system may determine that any image includes multiple signals, and it may perform the steps above for any or all of the traffic signals in such an image.

Once the classifier is trained, at 311 the vehicle may then process newly-captured images via the classifier so that the classifier returns states of traffic signals in the images. The vehicle's AV operating system may then use this information when making decisions about how and where to move in an environment.

Figure 4:
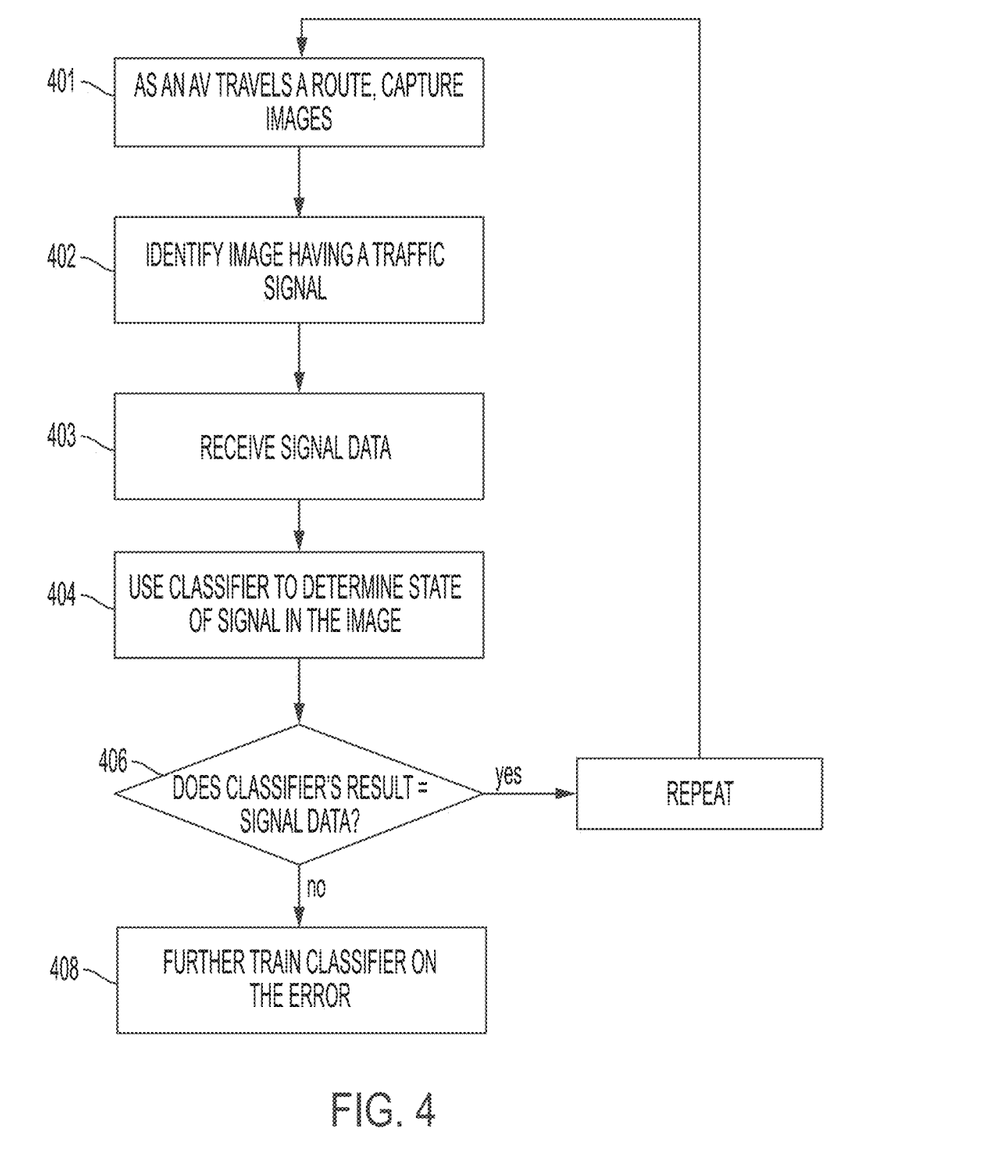
FIG. 4 illustrates a process by which a system may use incorrect performance by a classifier to improve the classifier's training and future performance.

The system also may use signal data such as SPaT signals to improve a classifier once a vehicle is using the classifier in operation. This is shown in FIG. 4, in which at step 401 a vehicle traveling in an environment captures images. At step 402, the system identifies images that contain a signal using one or more processes such as those discussed above in the context of FIG. 3. At step 403 the system also receives traffic signal data such as SPaT messages or other signal data as also discussed above in the context of FIG. 3. At step 404 (which may occur before, after, or simultaneously with step 403) the system will process the image with a classifier to return a label for a traffic signal in the image. The system will then determine whether the classifier's result (i.e., the returned label) matches the signal state received in the traffic signal data (step 406). If the labels match, the system may continue operating, use the label to make operational decisions. If the labels do not match, at step 408 the system may pass the image and the labels to the classifier so that the classifier can learn from the incorrect classification (with the expectation that the signal data is correct and that the classifier incorrectly classified the signal).

Figure 5:
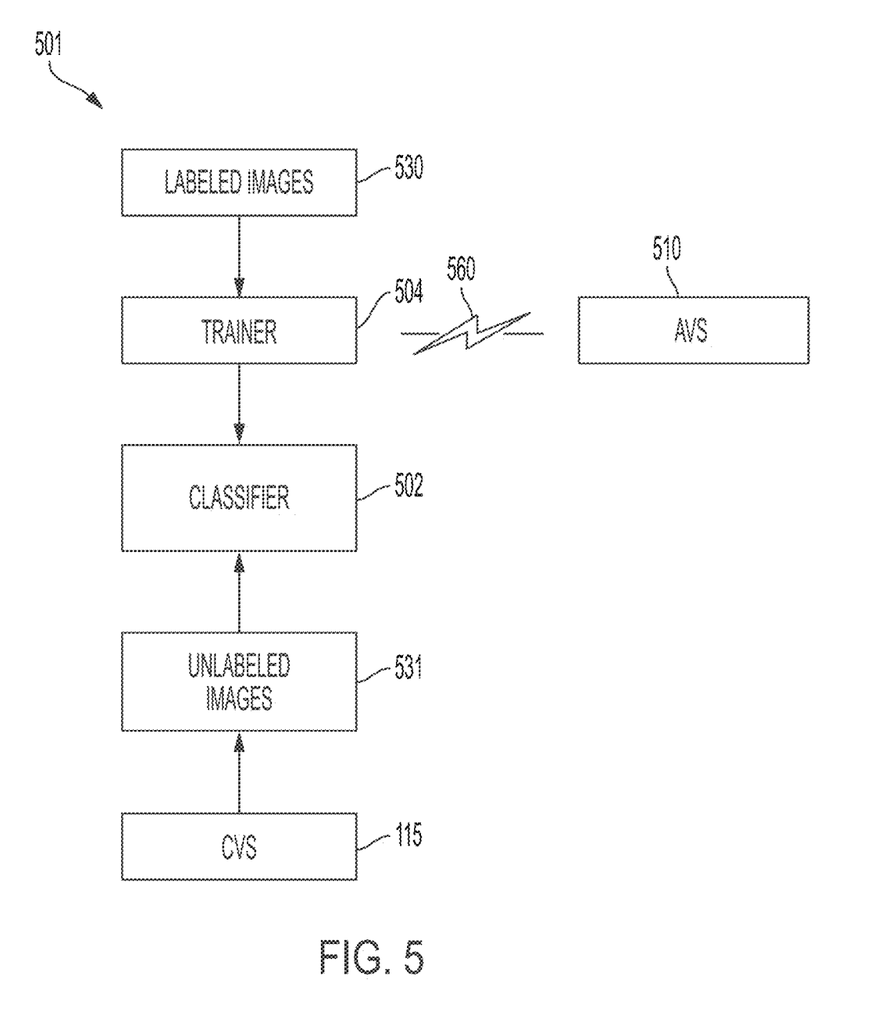
FIG. 5 illustrates an example traffic light classification pipeline, including the use of labeled data to train a classifier, and the classification of unlabeled images to control operation of a vehicle.

FIG. 5 is a block diagram of an example of a traffic light classifier (TLC) pipeline 501, that is, an overall flow of how onboard components of a vehicle and/or offboard components such as a remote server may use labeled images to train a classifier, and how an AV then may use the classifier to make operational decisions. The TLC pipeline 501 may include a classifier 502 configured to classify traffic signal elements and/or traffic light devices detected in images 531 that a vehicle's CVS 115 takes at or near an intersection in an environment. The classifier 502 may include a set of programming instructions stored in memory which when executed by a processor performs the traffic light classification functions described in this document using machine learning algorithms. Labeled images 530 may be sent to a classifier trainer 504, which is an instance of the classifier that analyzes labeled images and uses the analysis results to learn patterns and features of various traffic signal states. The classifier trainer 504 may be an element of the vehicle, or it may be an offboard system such as a remote server. Each of the classifier 502, classifier trainer 504 and classifier filter 510 may include a software, firmware and/or hardware module that includes programming instructions that are configured to instruct a processor to perform the functions of classifying, training and filtering, as described herein.

The TLC pipeline 501 may be configured to produce a control signal 560 representative of the state of a traffic signal device in an image and transfer the control signal the vehicle's automated vehicle system (AVS) 565, which includes processing systems and software to control movement of the vehicle through an intersection. For example, the vehicle's AVS 565 may use the detected traffic signal state to generate a signal that is the acceleration and/or speed of the vehicle as the vehicle approaches the intersection. If the traffic signal element is classified as a red light, the AVS 565 may activate the vehicle's brake controller and cause the vehicle to stop.

Figure 6:
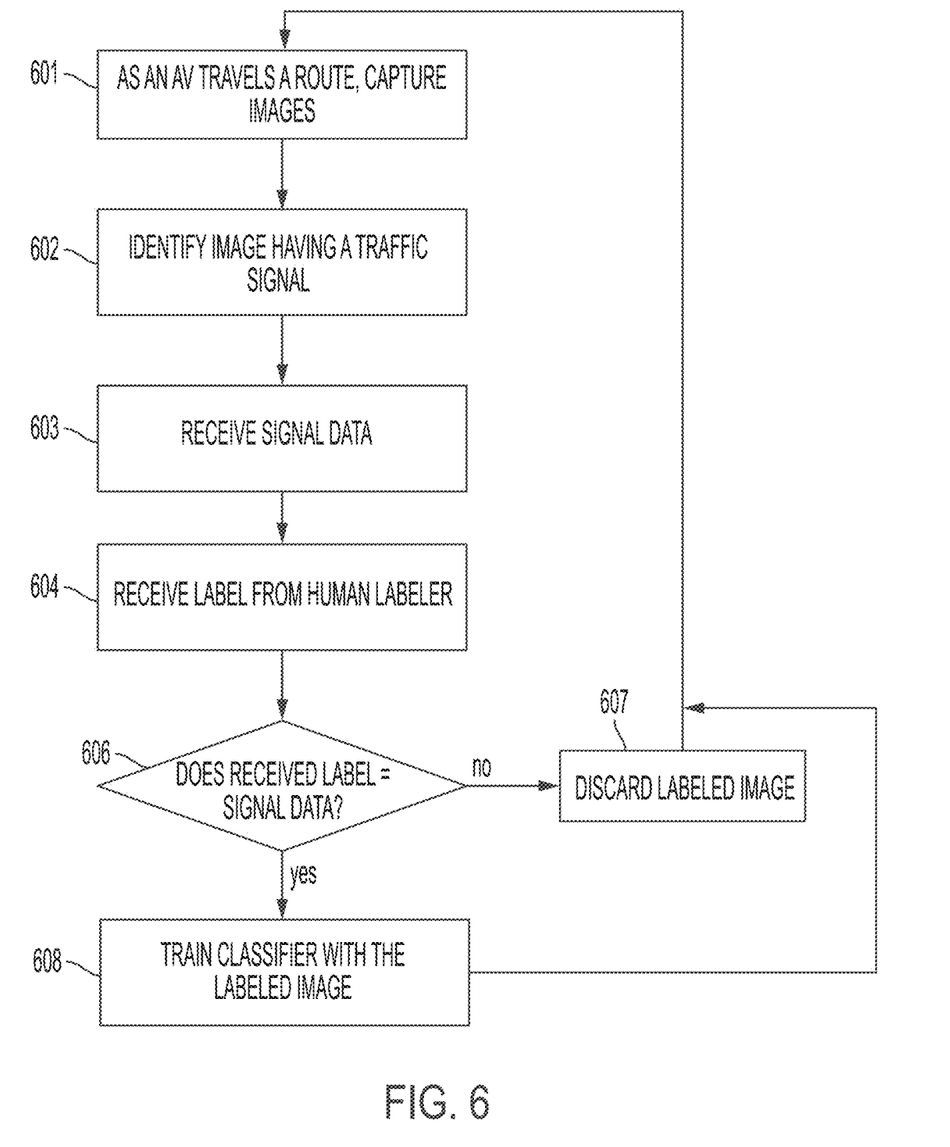
FIG. 6 illustrates a process by which a system may evaluate the performance of human labelers when developing a set of training data for a classifier, and in which a system may filter out potentially unreliable data so that such data is not used in training.

In some embodiments, the system also may use signal data to evaluate the performance of human labelers when developing a set of training data for a classifier. This is illustrated in FIG. 6, in which at step 601 a vehicle traveling in an environment captures images. At step 602, the system identifies images that contain a signal using one or more processes such as those discussed above in the context of FIG. 3, or by human identification. At step 603 the system also receives traffic signal data such as SPaT messages or other signal data as also discussed above in the context of FIG. 3. At step 604 (which may occur before, after, or simultaneously with step 603) the system will receive, from a human labeler via a user interface, input of a label for a traffic signal in the image. The system will then determine whether the manually input label matches the signal state received in the traffic signal data (step 606). If the labels match, at step 608 the system may pass the image and the labels to the classifier for use in training the classifier. If the labels do not match, at step 607 the system will not use the image and label to train the classifier, as the human-input label will be deemed to be unreliable. Optionally, data corresponding to the number of images used, and the number of images discarded, for any individual labeler or group of labelers may be stored and used to evaluate performance of the individual or the group.

Figure 7:
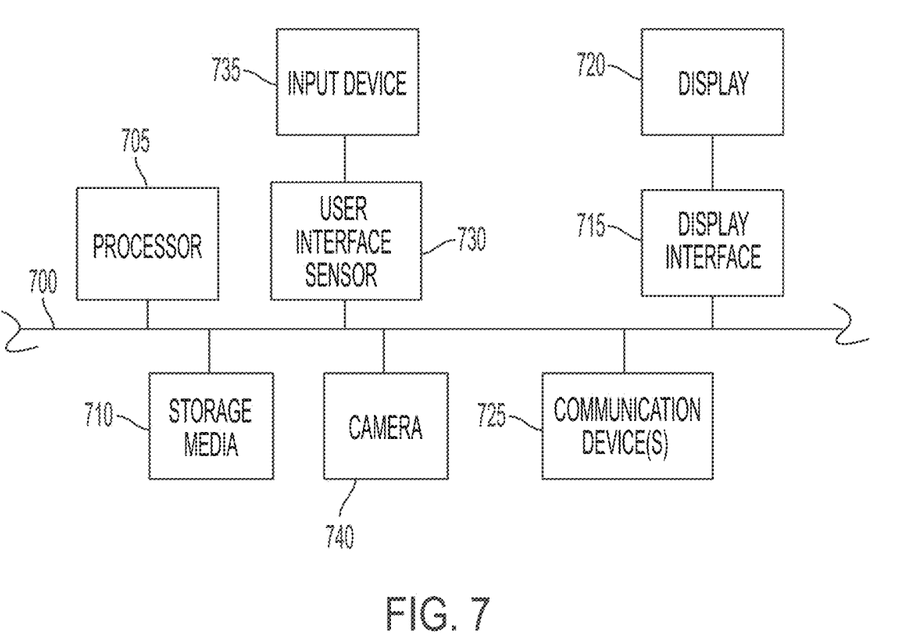
FIG. 7 is a block diagram that illustrates of example hardware that may be used to contain or implement programming instructions according to various embodiments of the present disclosure.

FIG. 7 depicts an example of internal hardware that may be included in any of the electronic components of the system, such as internal processing systems of an AV, elements of an RSU or ATC, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices (i.e., storage media) 710. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 715 may permit information from the bus 700 to be displayed on a display device 720 in visual, graphic or alphanumeric format, such on an in-dashboard display system of the vehicle. An audio interface and audio output (such as a speaker) also may be provided. Communication with external devices may occur using various communication devices 725 such as a wireless antenna, a radio frequency identification (RFID) tag and/or short-range or near-field communication transceiver, each of which may optionally communicatively connect with other components of the device via one or more communication system. The communication device(s) 725 may be configured to be communicatively connected to a communications network, such as the Internet, a local area network or a cellular telephone data network.

The hardware may also include a user interface sensor 730 that allows for receipt of data from input devices 725 such as a keyboard or keypad, a joystick, a touchscreen, a touch pad, a remote control, a pointing device and/or microphone. Digital image frames also may be received from a camera 740 that can capture video and/or still images.

The features and functions discussed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "road," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "storage media/medium," "data store," "data storage facility" and the like each refer to a non-transitory device on which computer-readable data, programming instructions or both are stored. Except where specifically stated otherwise, the terms "memory," "memory device," "storage media/medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "classifier" means an automated process by which a system use artificial intelligence to assign a label to one or more data points. A classifier typically starts with a set of labeled training data and applies one or more machine learning algorithms to understand the features and patterns within data that correspond to various labels. The algorithms may include those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have mis-classified. A classifier will be implemented by a processor executing programming instructions, and it may operate on large data sets such as image data, LIDAR system data, and/or other data.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of training a classifier to identify traffic signal states in images, the method comprising:
   by a vehicle while traveling in an environment:
      using a camera to capture images of the environment,
      determining that a traffic signal is within a field of view of the camera, and
      saving a plurality of the images to a data store along with a time of capture of each saved image; and
   by a processor:
      processing the saved images to identify an image that includes the traffic signal, determining the time of capture of the identified image,
      receiving signal data, from a roadside unit, that indicates signal phase and timing of the traffic signal, analyzing the signal data received to determine a state of the traffic signal at the time of capture, labeling the identified image with a label of determined state, and passing the identified image and the label to a classifier; and by the classifier, using the identified image and the label to train the classifier.

2. The method of claim 1, further comprising:

by the processor, processing the saved images to identify a plurality of additional images that each include additional traffic signals;

by the processor, for each of the additional images:

extracting, from the data store, a time of capture for the additional image, analyzing additional signal data to determine a state of the additional traffic signal in the additional image at the time of capture for the additional image, labeling the additional image with a label the determined state of the additional traffic signal, and passing the additional image and its label to the classifier; and by the classifier, using the additional images and the labels for each of the additional images to further train the classifier.

3. The method of claim 1 further comprising:

by a vehicle, using a camera to capture new images of the environment; and by the processor:

determining that one of the new images includes a traffic signal, and using the classifier to determine a state of the traffic signal that is in the determined new image.

4. The method of claim 3 further comprising:

receiving, from a roadside unit, new signal data;

extracting a signal state of the traffic signal from the new signal data;

determining whether the extracted signal state matches the state that the classifier determined; and if the extracted signal state does not match the state that the classifier determined, using the determined new image, the extracted signal state and the state that the classifier determined to further train the classifier.

5. The method of claim 1, wherein determining that the traffic signal is within a field of view of the camera comprises, by the processor:

using a global positioning sensor to determine a location of the vehicle;

analyzing map data to identify features of the location that are ahead of the vehicle that are in the field of view of the camera; and determining that one of the identified features is the traffic signal.

6. The method of claim 1, wherein determining that the traffic signal is within a field of view of the camera comprises:

receiving, via a transceiver of the vehicle, map data from the roadside unit;

using a global positioning system sensor to determine a location of the vehicle; and correlating the map data to the determined location of the vehicle and a planned path of the vehicle to determine that the traffic signal is in the field of view.

7. The method of claim 1, wherein:

the processor includes a processor component that is integral with the vehicle: and determining that the traffic signal is within a field of view of the camera comprises detecting the traffic signal when processing the images to identify the image that includes the traffic signal.

8. The method of claim 1 further comprising:

by the processor:

receiving an annotation for the identified image, and when passing the identified image and the label to the classifier, also passing the annotation to the classifier; and by the classifier, also using the annotation to train the classifier.

9. The method of claim 1 further comprising, by the processor:

identifying an additional image that includes an additional traffic signal;

determining a time of capture for the additional image;

analyzing additional signal data, from the roadside unit, to determine a state of the additional traffic signal in the additional image at the time of capture for the additional image;

receiving a manually-input label for the additional traffic signal;

determining whether the determined state of the additional traffic signal matches the manually-input label; and if the determined state of the additional traffic signal matches the manually-input label, passing the additional image and its label to the classifier for use in training the classifier, otherwise not passing the additional image to the classifier.

10. A method of training a classifier of an autonomous vehicle to identify traffic signal states in images, the method comprising:

by a processor:

accessing a data store that contains digital images of an environment along with, for each of the images, a time of capture;

processing a group of the digital images identify an image that includes a traffic signal, determining the time of capture of the identified image, receiving, from a roadside unit, signal data that indicates signal phase and timing of the traffic signal, wherein the timing of the signal is indicative of how long a current state of the traffic signal is to persist;

analyzing the signal data received at the time of capture of the identified image to determine a state of the traffic signal of the identified image, labeling the identified image with a label of determined state, and passing the identified image and the label to a classifier for an autonomous vehicle; and by the classifier, using the identified image and the label to train the classifier.

11. The method of claim 10, further comprising, by the processor:

processing the digital images to identify a plurality of additional images that each include additional traffic signals; and for each of the additional images:

extracting, from the data store, a time of capture for the additional image, analyzing additional signal data, from the roadside unit, to determine a state of the additional traffic signal in the additional image at the time of capture for the additional image, labeling the additional image with a label the determined state of the additional traffic signal, and passing the additional image and its label to the classifier; and by the classifier, using the additional images and the labels for each of the additional images to further train the classifier.

12. The method of claim 10 further comprising, by the processor:

receiving new images of the environment;

determining that one of the new images includes a traffic signal; and using the classifier to determine a state of the traffic signal that is in the determined new image.

13. The method of claim 12 further comprising:

receiving, from the roadside unit, new signal data that was collected when the determined new image was captured;

extracting a signal state from the signal data;

determining whether the extracted signal state matches the state that the classifier determined; and if the extracted signal state does not match the state that the classifier determined, using the determined new image, the extracted signal state and the state that the classifier determined to further train the classifier.

14. The method of claim 10, wherein receiving the signal data comprises accessing the signal data that the processor received from the roadside unit as a signal phase and timing (SPaT) message.

15. The method of claim 10 further comprising:

by the processor:

receiving an annotation for the identified image, and when passing the identified image and the label to the classifier, also passing the annotation to the classifier; and by the classifier, also using the annotation to train the classifier.

16. The method of claim 10 further comprising, by the processor:

identifying an additional image that includes an additional traffic signal;

determining a time of capture for the additional image;

analyzing additional signal data, from the roadside unit, to determine a state of the additional traffic signal in the additional image at the time of capture for the additional image;

receiving a manually-input label for the additional traffic signal;

determining whether the determined state of the additional traffic signal matches the manually-input label; and if the determined state of the additional traffic signal matches the manually-input label, passing the additional image and its label to the classifier for use in training the classifier, otherwise not passing the additional image to the classifier.

17. A system for training a classifier to identify traffic signal states in images, the system comprising:

a processor and programming instructions that are configured to cause the processor to:

access a data store that contains digital images of an environment along with, for each of the images, a time of capture, process a group of the digital images identify an image that includes a traffic signal, determine the time of capture of the identified image, receive signal data, from a roadside unit, that indicates signal phase and timing of the traffic signal at the time of capture of the identified image from an external source, analyze the signal data received at the time of capture of the identified image to determine a state of the traffic signal at the time of capture of the identified image, label the identified image with a label of determined state, and pass the identified image and the label to a classifier of an autonomous vehicle to train the classifier.

18. The system of claim 17, further comprising a vehicle that comprises:

a camera configured to capture the images of the environment;

a processor; and a memory containing programming instructions that are configured to cause the processor of the vehicle to:

determine that a traffic signal is within a field of view of the camera, and save a plurality of the images to the data store along with the time of capture of each saved image.

19. The further of claim 18, wherein:

the system further comprises a global positioning sensor; and the instructions to determine that the traffic signal is within the field of view of the camera comprise instructions to:

use the global positioning sensor to detem line a location of the vehicle, analyze map data to identity features of the location that are ahead of the vehicle that are in the field of view of the camera; and determine that one of the identified features is the traffic signal.

20. The system of claim 18, wherein: the vehicle further comprises a transceiver; and the programming instructions further comprise instructions to receive, via the transceiver of the vehicle, the signal data from a roadside unit as a signal phase and timing (SPaT) message.

21. The system of claim 20, wherein the instructions to determine that the traffic signal is within a field of view of the camera comprise instructions to:

receive, via the transceiver, map data from the broadside unit;

use a global positioning system sensor to determine a location of the vehicle; and correlate the map data to the determined location of the vehicle and a planned path of the vehicle to determine that the traffic signal is in the field of view.

22. The method of claim 1, wherein the signal data is received from the roadside unit before the camera captures the images.

* * * * *